(12) United States Patent
Dahm et al.

(10) Patent No.: US 9,663,905 B2
(45) Date of Patent: May 30, 2017

(54) SWING OVER STEERING

(71) Applicant: Wirtgen GmbH, Windhagen (DE)

(72) Inventors: Martin Dahm, Gieleroth (DE); Ralf Schug, Oberlahr (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 15/203,890

(22) Filed: Jul. 7, 2016

(65) Prior Publication Data

US 2017/0030028 A1 Feb. 2, 2017

Related U.S. Application Data

(63) Continuation of application No. 14/299,875, filed on Jun. 9, 2014, now Pat. No. 9,388,537.

(51) Int. Cl.
| | | |
|---|---|---|
| *E01C 19/00* | (2006.01) | |
| *B62D 55/08* | (2006.01) | |
| *B62D 11/00* | (2006.01) | |
| *B62D 11/20* | (2006.01) | |
| *E01C 19/48* | (2006.01) | |

(52) U.S. Cl.
CPC .......... *E01C 19/004* (2013.01); *B62D 11/003* (2013.01); *B62D 11/20* (2013.01); *B62D 55/08* (2013.01); *E01C 19/48* (2013.01); *E01C 19/4893* (2013.01)

(58) Field of Classification Search
CPC .... E01C 19/004; E01C 19/48; E01C 19/4893; B62D 11/003; B62D 11/20; B62D 55/08
USPC .............................. 404/84.05, 118
See application file for complete search history.

(56) References Cited

U.S. PATENT DOCUMENTS

| | | | |
|---|---|---|---|
| 3,664,448 A | 5/1972 | Hudis | |
| 3,751,174 A | 8/1973 | Layton | |
| 3,792,745 A | 2/1974 | Files | |
| 3,970,405 A | 7/1976 | Swisher, Jr. et al. | |
| 4,029,165 A | 6/1977 | Miller et al. | |
| 4,360,293 A | 11/1982 | Wade | |
| 5,135,333 A | 8/1992 | Guntert, Sr. et al. | |
| 5,590,977 A | 1/1997 | Guntert et al. | |
| 5,615,972 A | 4/1997 | Guntert et al. | |
| 6,106,073 A | 8/2000 | Simons et al. | |
| 6,390,728 B1 | 5/2002 | Casters | |
| 6,471,442 B1 | 10/2002 | Deeb et al. | |

(Continued)

FOREIGN PATENT DOCUMENTS

| | | |
|---|---|---|
| DE | 19814052 A1 | 10/1999 |
| EP | 0893539 A1 | 1/1999 |
| EP | 1596006 A1 | 11/2005 |

OTHER PUBLICATIONS

EPO Search report dated Oct. 19, 2015 in European App. No. 15153905.3-1604 corresponding to U.S. Appl. No. 14/299,875 (not prior art), 5 pages.

*Primary Examiner* — Raymond W Addie
(74) *Attorney, Agent, or Firm* — Lucian Wayne Beavers; Patterson Intellectual Property Law, PC

(57) ABSTRACT

A self-propelled construction machine includes a plurality of swing legs, each swing leg being supported from a ground surface by an associated crawler track steerably connected to an outer end of its associated swing leg. Pivotal movement of a swing leg may be accomplished by steering the associated crawler track through a non-zero steering angle until the lateral movement of the crawler track achieves the desired pivoting movement of the associated swing leg.

19 Claims, 13 Drawing Sheets

(56) References Cited

U.S. PATENT DOCUMENTS

| | | |
|---|---|---|
| 6,481,923 B1 | 11/2002 | Casters |
| 6,692,185 B2 | 2/2004 | Colvard |
| 6,773,203 B2 | 8/2004 | Casters |
| 6,872,028 B2 | 3/2005 | Aeschlimann et al. |
| 6,890,123 B2 | 5/2005 | Piccoli |
| 7,287,931 B2 | 10/2007 | Anibaldi et al. |
| 7,523,995 B2 | 4/2009 | Rio et al. |
| 8,118,518 B2 | 2/2012 | Guntert, Jr. et al. |
| 8,459,898 B2 | 6/2013 | Guntert, Jr. et al. |
| 2003/0180092 A1 | 9/2003 | Piccoli |
| 2005/0249554 A1 | 11/2005 | Anibaldi et al. |
| 2010/0284742 A1 | 11/2010 | Christ et al. |
| 2011/0194898 A1 | 8/2011 | Guntert, Jr. et al. |
| 2011/0236129 A1 | 9/2011 | Guntert, Jr. et al. |
| 2014/0054950 A1 | 2/2014 | Berning et al. |

SWING OVER STEERING

This application is a continuation of U.S. application Ser. No. 14/299,875, now U.S. Pat. No. 9,388,537.

BACKGROUND OF THE INVENTION

1. Field of the Invention

The present invention relates to methods and apparatus for operating self-propelled construction machines, and more particularly, but not by way of limitation, to methods and apparatus for operating slipform paving machines.

2. Description of the Prior Art

One known arrangement for a self-propelled construction machine includes a generally rectangular machine frame having a swing leg mounted at each corner of the frame and having a crawler track mounted at the free end of each swing leg. The crawler tracks provide the motive force for the construction machine. The mounting of the crawler tracks on the swing legs allows the crawler tracks to be repositioned in a horizontal plane relative to the machine frame for various reasons. For example, a slipform paving machine utilizing such construction may need to spread the forward extending swing legs in order to make room for a paving kit or other equipment supported from the machine frame. Also, it may be desirable during operation of the machine to relocate one or more of the swing legs and its associated crawler track to avoid obstacles. Also, the swing legs allow the crawler tracks to be repositioned for transport of the construction machine.

Various systems have been proposed for controlling the pivoting movement of the swing legs relative to the machine frame.

One system set forth in Swisher U.S. Pat. No. 3,970,405 provides that each track is individually raised off of the ground surface one at a time, and then the swing leg is manually pivoted to the desired orientation where it is fixed in place using turn buckles. Disadvantages of this system include the need to individually raise each track off the ground one at a time, and the need to realign the steering after adjusting the leg orientation.

Another approach is found in Aeschlimann U.S. Pat. No. 6,872,028 in which the swing legs are constructed as parallelogram linkages so that as the swing leg pivots in or out the steering direction of the crawler track remains unchanged.

Another solution is provided in Guntert U.S. Pat. No. 8,459,898 which provides a hydraulic ram between the swing leg and the machine frame which pivots the swing leg to a desired orientation. An automatic controller senses the change in pivot angle of the swing leg and maintains the steering angle of the crawler track in response to the change in pivot angle as the swing leg pivots.

The Aeschlimann and Guntert systems offer a solution to one problem present in the Swisher '405 patent, namely the need to individually raise each track off of the ground one at a time. However they create a new problem. Solutions like that of Aeschlimann or Guntert which maintain the steering angle of the crawler track while the swing leg pivots cause a sideways skidding of the crawler track across the ground surface. This sideways skidding contributes to wear of the crawler track and shaking of the machine, which is undesirable especially during paving. These machines are quite heavy and the footprint of the tracks is large, so the resistance to this skidding action is high.

Thus there is a continuing need for improvements in the arrangements for the control of the pivoting of swing legs of such automotive construction machines.

SUMMARY OF THE INVENTION

In one embodiment a method is provided for operating a self-propelled construction machine, the machine including a machine frame, first and second swing legs pivotally connected to the machine frame, and first and second ground engaging units steerably connected to the first and second swing legs, respectively. The method includes steps of:
 (a) moving the machine across a ground surface under the power of at least the first and second ground engaging units;
 (b) as the machine moves, continuously steering the first ground engaging unit at a non-zero steering angle relative to an initial direction of the first ground engaging unit so that movement of the first ground engaging unit along the ground surface has a perpendicular component of direction perpendicular to the initial direction and a parallel component of direction parallel to the initial direction, and thereby pivoting the first swing leg in a first pivotal direction from an initial pivotal position to a revised pivotal position relative to the machine frame as a result of the perpendicular component of direction of the first ground engaging unit; and
 (c) after pivoting the first swing leg to the revised pivotal position relative to the machine frame, maintaining the revised pivotal position of the first swing leg.

In another embodiment a construction machine includes a machine frame, first and second swing legs pivotally connected to the machine frame, and first and second ground engaging units steerably connected to the swing legs. The ground engaging units include drive motors configured such that the ground engaging units are driven across a ground surface by the drive motors. A first steering sensor is configured to detect a first steering angle of the first ground engaging unit relative to the first swing leg. A second steering sensor is configured to detect a second steering angle of the second ground engaging unit relative to the second swing leg. A first lock is configured to selectively lock and unlock the first swing leg in pivotal position relative to the machine frame. A second lock is configured to selectively lock and unlock the second swing leg in pivotal position relative to the machine frame. A controller includes a swing leg pivot mode configured to allow each of the first and second swing legs to pivot relative to the machine frame in response to steering of the ground engaging unit connected to each swing leg while the machine moves in the direction of forward operation.

In another embodiment a method is provided of operating a self-propelled construction machine. The machine includes a machine frame, first and second swing legs pivotally connected to the machine frame, first and second locks configured to selectively lock the first and second swing legs, respectively, in selected pivotal positions relative to the machine frame, and first and second ground engaging units steerably connected to the first and second swing legs, respectively. The method includes steps of:
 (a) moving the machine across a ground surface under power of at least the first and second ground engaging units, the first and second locks being in locked positions, so that the first and second swing legs are pivotally fixed relative to the machine;

(b) unlocking at least the first lock such that the first swing leg may pivot relative to the machine frame;

(c) while the first lock is unlocked, moving the machine across the ground surface and steering at least the first ground engaging unit such that the first swing leg pivots relative to the machine frame from an initial pivotal position to a final pivotal position; and (d) after the first swing leg reaches the final pivotal position, locking the first lock such that the first swing leg is maintained in the final pivotal position.

In any of the above embodiments, the second ground engaging unit may be steered simultaneously with the first ground engaging unit in a direction opposite to the first ground engaging unit.

In any of the above embodiments, the first and second pivot legs may swing toward each other or away from each other.

In any of the above embodiments, the machine may include first and second linear actuators configured to hold the first and second swing legs, respectively in selected pivotal positions relative to the machine frame. As the first pivot leg is pivoted the first linear actuator may be de-activated so that the first linear actuator does not resist the pivotal motion of the first swing leg relative to the machine frame.

In any of the above embodiments, the linear actuators may be hydraulic rams, and the first linear actuator may be de-activated by hydraulically un-blocking the first hydraulic ram.

In any of the above embodiments, the first linear actuator may be activated to hold the first swing leg in the revised pivotal position.

In any of the above embodiments, the linear actuators may actively facilitate the pivoting of the swing legs. This active facilitation may result in an absolute pivoting motion based upon an algorithm. Alternatively, this active facilitation may provide a controlled pressure to the hydraulic ram.

In any of the above embodiments, the first ground engaging unit may be steered such that the first ground engaging unit moves in a S-curve along the ground surface beginning parallel to the initial direction, then steering away from and then back toward the initial direction.

In any of the above embodiments, the ground engaging units may be steered under control of an automatic controller in response to an operator input corresponding to the revised pivotal position.

In any of the above embodiments, the first and second swing legs may be forward extending swing legs.

In any of the above embodiments the first and second swing legs may be rearward extending swing legs.

In any of the above embodiments the construction machine may be a slip form paving machine.

In any of the above embodiments the ground engaging units may be either crawler tracks or wheels.

BRIEF DESCRIPTION OF THE DRAWINGS

FIG. 5 shows the special case wherein swing leg initially extends straight ahead and the initial direction of the crawler track is straight ahead.

DETAILED DESCRIPTION

Figure 1:
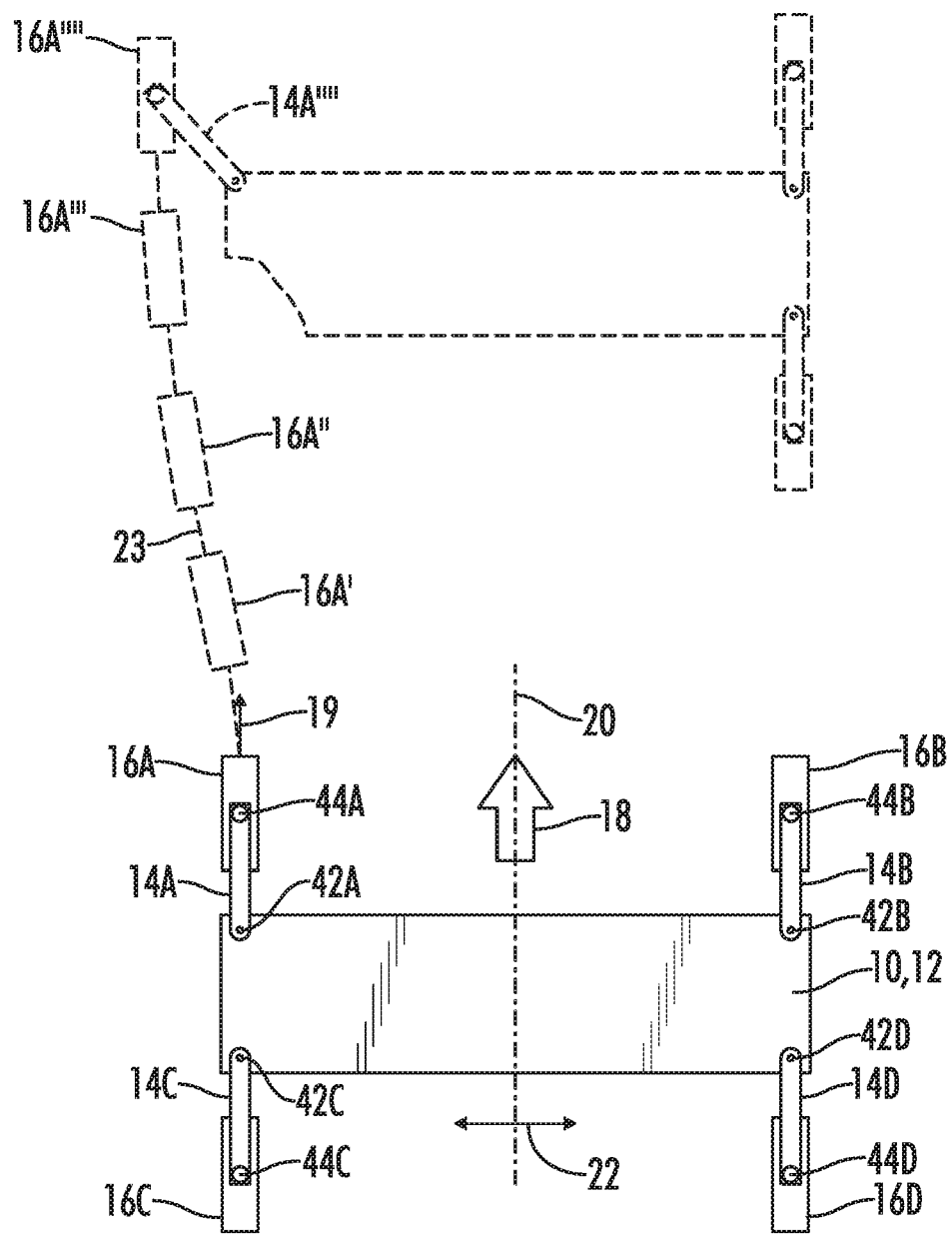
FIG. 1 is a schematic plan view of a self-propelled construction machine as it moves forward from an initial position shown in the lower part of the figure in solid lines to a final position shown in the upper part of the figure in dashed lines. The left front crawler track is steered so as to pivot the left front swing leg outward as the construction machine moves from the initial position to the final position.
Figure 10:
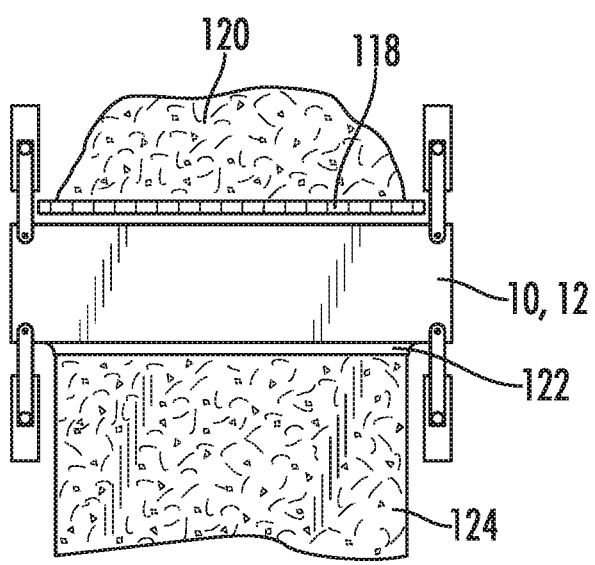
FIG. 10 is a schematic plan view of the construction machine of FIG. 1 embodied as a slipform paving machine.

FIG. 1 schematically illustrates a method of operating a self-propelled construction machine 10. The machine 10 includes a machine frame 12. As schematically illustrated in FIG. 10, the construction machine 10 may be a slip-form paver having a spreader apparatus 118 arranged to engage a mass 120 of concrete which is shaped by form 122 so that a shaped slab 124 of concrete is slip-formed by the machine 10 and exits the rear of the machine 10. The slip-form paving machine 10 illustrated in FIG. 10 may be of any conventional construction with regard to its machine frame 12 and the arrangement of supporting swing legs and crawler tracks. The machine frame 12 may be a fixed width frame. The machine frame 12 may be a single telescoping frame which expands to one side of a main frame module for adjustment of frame width. The machine frame 12 may be a dual telescoping frame which extends from both sides of the main frame module for expansion and contraction of the width of the machine frame. The slip-form paving machine 10 may have either three or four tracks, at least one track being connected to an associated swing leg.

First, second, third and fourth swing legs 14A, 14B, 14C and 14D are pivotally connected to the machine frame 12 at pivotal axes 42A, 42B, 42C and 42D. First, second, third and fourth crawler tracks 16A, 16B, 16C and 16D are steerably connected to free ends of the swing legs 14A, 14B, 14C and 14D, respectively, at steering axes 44A, 44B, 44C and 44D. The crawler tracks may be generally referred to as ground engaging units. The ground engaging units may be crawler tracks as shown, or alternatively may be wheels.

The machine frame 12 defines a longitudinal direction 18 along a longitudinal axis 20 for forward or reverse motion of the construction machine 10. The machine frame further defines a lateral direction 22 perpendicular to the longitudinal direction 18. The machine 10 moves across a ground surface under the power of the crawler tracks.

As the machine 10 moves from the initial position shown in solid lines in FIG. 1 to the final position shown in dashed lines in FIG. 1, the first crawler track 16A is continuously steered along a path 23 and thereby pivots the first swing leg 14A. This steering and pivoting motion is best explained with reference to FIG. 5, in which the track 16A is shown in an initial orientation in solid lines, and oriented at a non-zero steering angle 24 in dashed lines. Similarly, the swing leg 14A is shown in an initial position in solid lines, and is shown as having been pivoted through a pivot angle 28 in dashed lines.

As used herein the term "continuously steered" refers to a continuous but possibly varying steering input to the respective track throughout the change in track steering direction.

Figure 5:
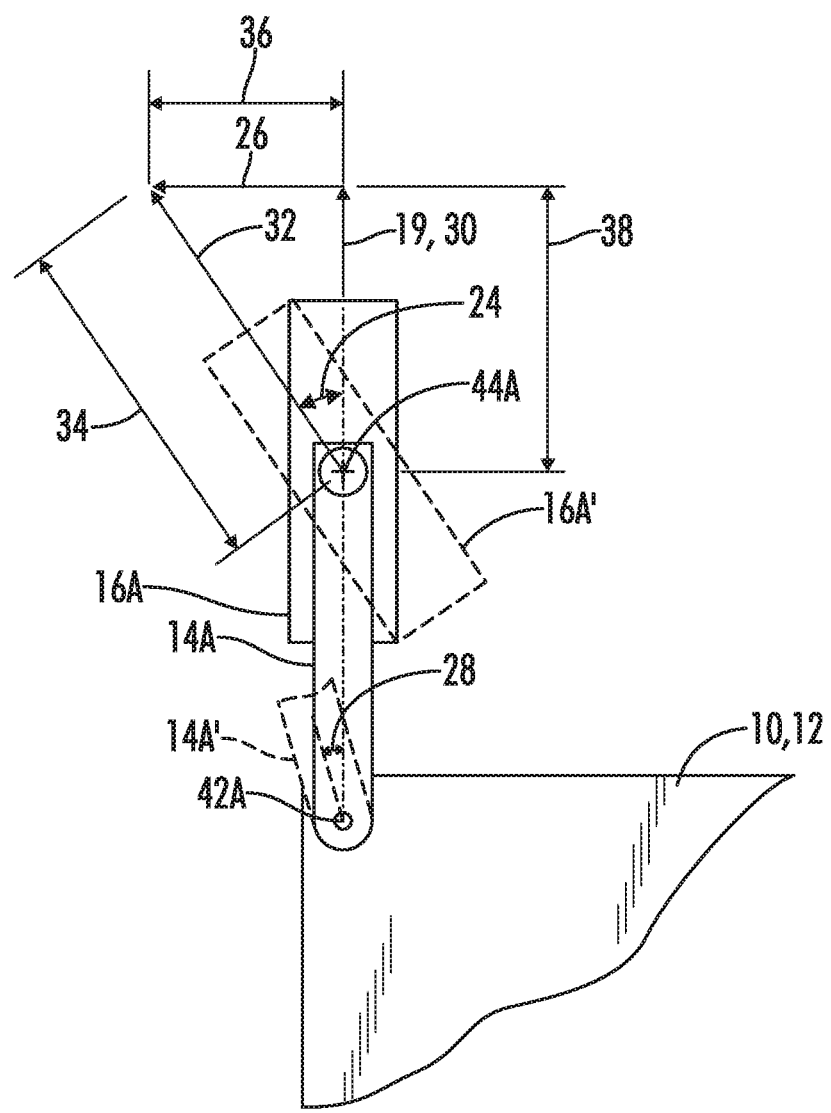
FIG. 5 is a schematic plan view of the left front corner of the construction machine of FIG. 1 illustrating the steering angle of the crawler track relative to the swing leg, and illustrating the pivot angle of the swing leg relative to the machine frame.
Figure 5A:
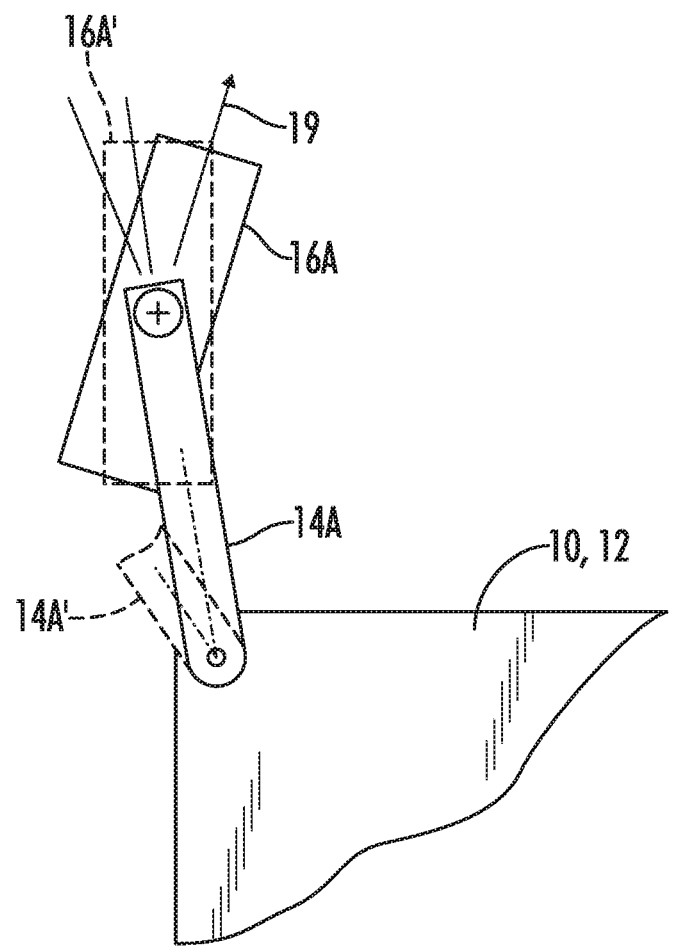
FIG. 5A is a view similar to FIG. 5 showing the more general situation wherein the swing leg initially does not extend straight ahead and the initial direction of the crawler track is not straight ahead.

In the example shown in FIG. 5, for ease of illustration the initial direction has been shown as a straight ahead direction, and the initial position of the swing leg has been shown as a straight ahead position. But it will be understood that in the more general and typical situation the pivot legs will not necessarily begin in the straight ahead position and the initial steering angle of the tracks will not necessarily begin in the straight ahead direction. More generally, as shown in FIG. 5A the starting point for a steering operation as described herein begins with the pivot legs in an initial position and the tracks steering in an initial direction, neither of which need be oriented straight ahead. For example, the forward pivot legs may already be angled away from each other, and the tracks may be steering the machine on a curved path as seen in FIG. 5A, and from that initial starting position a steering operation as described below may be performed to move the pivot legs either toward or away from each other in response to steering of the tracks away from their initial steering angles.

It is noted that before the swing leg 14A can be pivoted as shown in FIG. 1, the locking mechanism associated with the swing leg must be released as is described below regarding the hydraulic ram or locking mechanism 40A.

In the example of FIGS. 1 and 5, as the machine 10 moves along the path 23, the crawler track 16A is continuously steered at a non-zero steering angle 24 relative to an initial direction 19 of track 16A so that movement of the crawler track 16A along the ground surface has a perpendicular component of direction 26 perpendicular to the initial direction 19, and a parallel component of direction 30 parallel to the initial direction 19 as the track moves in the track steering direction 32. Thus, assuming no slippage of the crawler track 16A, as the crawler track 16A moves in the track steering direction 32 by a magnitude 34, the magnitude of the perpendicular movement component 26 is indicated as 36 and the magnitude of the parallel component of direction 30 is indicated as 38. It will be appreciated that as the track 16A advances in the track steering direction 32 by one unit of magnitude, the perpendicular component 26 of movement will be equal to the sine of angle 24, and the parallel component of movement 30 will be equal to the cosine of angle 24.

It will also be appreciated that the overall direction of the machine frame 12 is maintained in the initial direction 19 under control of the other tracks 16B, 16C and 16D which in this example will continue to be pointed straight ahead. In the more general situation as represented by FIG. 5A the machine direction may be changing as the machine 10 moves along a curved path.

As the machine 10 moves forward from the initial position shown in solid lines in FIGS. 1 and 5, the perpendicular component of motion 26 of the track 16A pivots the swing arm 14A from the position shown in solid lines to the position(s) shown in dashed lines in FIGS. 1 and 5.

The movement of the swing leg 14A may be described as pivoting the swing leg 14A in a counterclockwise first pivotal direction from an initial pivot position shown in solid lines in FIG. 1 to a revised pivotal position relative to the machine frame 12 shown in dashed lines in FIG. 1, which revised position is a result of the perpendicular component of direction 26 of the crawler track 16A.

In the example shown in FIG. 1, the path 23 along which the crawler track 16A moves may be described as an S-curve along the ground surface beginning at a zero steering angle 24 parallel to the initial direction 19, then steering at first in increasing non-zero angles as seen at intermediate positions 16A' and 16A" and then decreasing non-zero angles as indicated at intermediate position 16A''' until the first crawler track 16A is returned to a zero steering angle again parallel to the initial direction in the final position indicated as 16A"". In more general terms, the S-curve may be described as beginning parallel to the initial direction, then steering away from and then back toward the initial direction.

It will be understood that when the machine 10 is moving along a curved path, as represented in FIG. 5A, the tracks will not all be steering in the same direction. Preferably, in accordance with the Ackermann steering principle, some or all of the tracks will be steering at different angles so that each track is perpendicular to a line drawn to an imaginary common center point. In the situation of FIG. 5A, with the machine 10 moving along a curved path, the tracks associated with the swing legs which are being pivoted will not necessarily be steered back to a final direction parallel to the initial direction of the track, because the direction of the machine will have changed. Thus the track may be steered back to a final direction which corresponds to a current direction of the machine, in accordance with the desired steering geometry such as the Ackermann steering principle.

After the pivoting of the swing leg 14A to the revised pivotal position relative to the machine frame shown in the upper dashed line image in FIG. 1, the first swing leg is preferably locked in place in its revised pivotal position. This is accomplished with a hydraulic ram 40A best shown in FIG. 6. The hydraulic ram 40A may also be referred to as a linear actuator or as a hydraulic actuator or as a hydraulic cylinder. Also, after moving the swing leg 14A to the desired revised pivotal position, the crawler track 16A is preferably returned to and maintained parallel to the initial direction 19, or to another desired steering direction corresponding to the current direction of the machine 10.

It is noted that the linear actuators 40 could also be electric actuators rather than hydraulic actuators.

Figure 6:
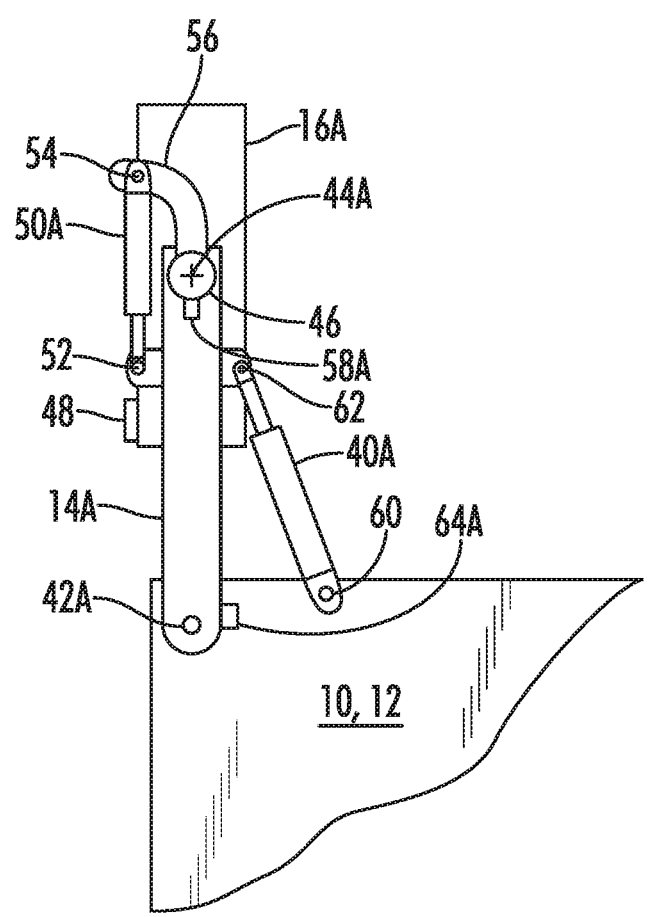
FIG. 6 is a schematic plan view of the left front corner of the construction machine of FIG. 1 showing the mechanical components of the steering system and the pivot control system of the left front swing leg.

FIG. 6 schematically illustrates the mechanical components of the steering system and the pivot control system of the machine 10.

In FIG. 6, the first swing leg 14A is shown pivotally connected to the machine frame 12 at pivotal connection or pivotal axis 42A. The first crawler track 16A is steerably connected to the outer end of swing leg 14A so that the crawler track 16A can be steered about the vertical steering axis 44A of a lifting column 46 by which the outer end of the swing leg 14A is supported from the crawler track 16A. As will be understood by those skilled in the art, extension and retraction of the lifting column 46 can raise and lower the machine frame 12 relative to the crawler track 16A and thus relative to the ground surface. Each of the crawler tracks includes a drive motor 48 such that the crawler tracks are driven across the ground surface by the drive motors in a known manner. The drive motor 48 may be either a hydraulic motor or an electric motor.

Steering of the crawler track 16A relative to the swing leg 14A about the vertical axis 44A is accomplished by extension and retraction of a hydraulic steering cylinder 50A pivotally connected at 52 to an intermediate location on the swing leg 14A and pivotally connected at 54 to a steering arm 56 connected to rotate with the crawler track 16A. Alternatively, instead of the use of a hydraulic ram steering cylinder 50A, the track 16A may be steered relative to the swing leg 14A by a rotary actuator such as a worm gear or slew gear drive. Also, an electric actuator may be used instead of a hydraulic actuator, to steer the crawler track.

Each of the swing legs such as 14A may have a steering sensor 58 associated therewith, which steering sensors are configured to detect the steering angles of their respective crawler tracks relative to their respective swing legs. The steering sensors associated with the crawler tracks 16A and 16B are designated as 58A and 58B in the schematic control diagram of FIG. 7. The steering sensors may for example each be an electro-magnetic encoder, commercially available from TWK-Elektronik GmbH, Heinrichstrasse 85, 40239 Düsseldorf, Germany, as TMA 50-S A 180 W S A 16.

The swing leg 14A can be held in place pivotally relative to the frame 12 by the previously mentioned hydraulic ram 40A. The hydraulic ram 40A is pivotally connected to the machine frame 12 at pivotal connection 60 and to an intermediate location on the swing leg 14A at pivotal connection 62.

In the drawings the swing legs 14 and the hydraulic rams 40 are schematically illustrated as being directly connected to the machine frame 12. It will be understood, however, that the swing legs and the hydraulic rams do not have to be directly connected to the machine frame 12. Instead, the swing legs and the hydraulic rams may be indirectly connected to the machine frame 12 by suitable mounting brackets. When one of these components is described herein as being connected to the machine frame, that includes both direct and indirect connections.

Each of the swing legs such as 14A may have a pivot sensor 64 configured to detect the respective pivot angle 28 of the respective swing leg 14. In the schematic view of the control diagram of FIG. 7, the pivot sensors for the first and second swing legs 14A and 14B are indicated as 64A and 64B. The pivot sensors may for example each be an angle sensor commercially available from Elobau GmbH & Co. K G, Zeppelinstr. 44, 88299 Leutkirch, Germany, as Part No. 424A11A05002.

Figure 7:
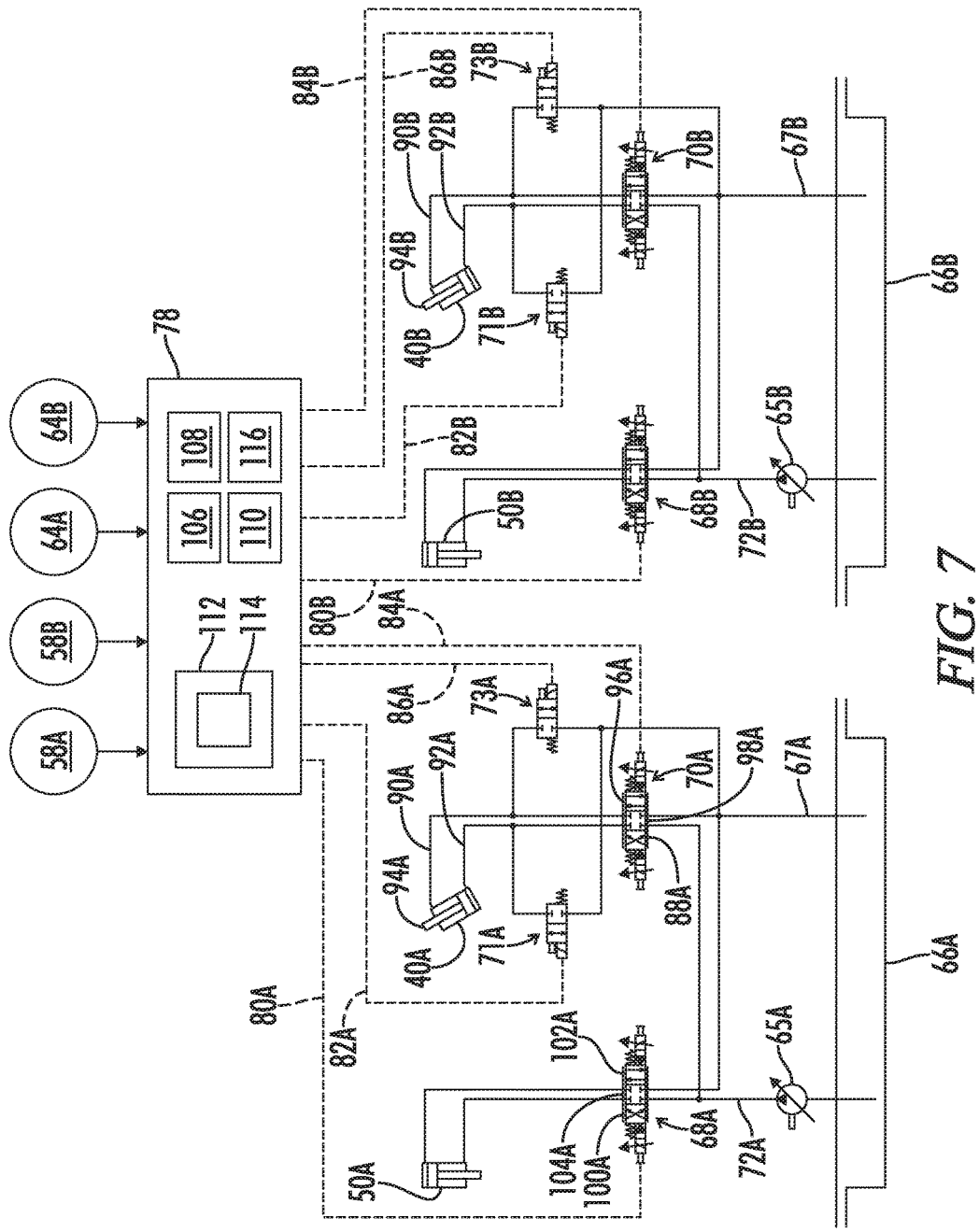
FIG. 7 is a schematic illustration of the hydraulic power system and the electronic control system for the steering system and the pivot control system of the construction machine of FIG. 1.

FIG. 7 schematically illustrates, among other things, one embodiment of a hydraulic control diagram for operation of the steering cylinder 50A and the hydraulic ram 40A associated with crawler track 16A and swing leg 14A. Also shown in FIG. 7 are the similar steering cylinder 50B and hydraulic ram 40B associated with crawler track 16B and swing leg 14B.

The steering cylinder 50A and the hydraulic ram 40A may each be double acting hydraulic cylinders. Hydraulic fluid under pressure is provided to the cylinders from a source such as hydraulic pump 65A, and fluid discharged from the cylinders is returned to a hydraulic reservoir 66A via a return line 67A. Although FIG. 7 shows individual pumps 65 and reservoirs 66 for each leg, a common pump and reservoir may be used for multiple legs.

Directional control of hydraulic fluid into and out of the steering cylinder 50A is controlled by a first solenoid actuated variable flow three way servo-valve 68A, and control of fluid into and out of the hydraulic ram 40A is controlled by a second solenoid actuated variable flow three way servo-valve 70A.

Hydraulic fluid under pressure from pump 65A flows through a hydraulic fluid supply line 72A, to each of the variable flow three way servo-valves 68A and 70A. These variable flow valves may also be referred to as proportional valves. The valves 68A and 70A can control both the direction and the rate of flow of fluid to their respective hydraulic cylinders.

The three way valve 70A associated with the hydraulic ram 40A has a first position 88A wherein hydraulic fluid under pressure is provided to an upper end of the cylinder via hydraulic line 90A and received from a lower end of the cylinder via hydraulic line 92A for retraction of a piston 94A of the hydraulic ram 40A. The three way valve 70A can be moved to a second position 96A in which the direction of flow is reversed to extend the piston 94A. The three way valve 70A can be moved to a third position 98A wherein flow of hydraulic fluid to and from the hydraulic ram 40A is blocked. It is noted that the hydraulic lines 90A and 92A may be referred to as first and second hydraulic lines 90A and 92A, but such designation is for identification only and does not imply any specific functionality.

Also associated with the hydraulic ram 40A are first and second solenoid actuated bypass valves 71A and 73A connected to the hydraulic lines 92A and 90A. Each of the bypass valves can be selectively moved to either an open or a closed position as indicated. When in their open positions the bypass valves communicate both sides of the hydraulic ram 40A with the hydraulic reservoir 66A via the return line 67A.

Each of the hydraulic rams 40 and its associated three way valve 70 and bypass valves 71 and 73 may be referred to as a hydraulic control system or as a lock.

The construction machine 10 includes a controller 78, which may be part of a master control system of the machine 10, or may be a separate controller. The controller 78 receives input signals from various sensors such as the steering sensors 58A and 58B and the pivot sensors 64A and 64B.

It will be understood that the controller 78 may receive additional input signals from steering sensors and pivot sensors associated with the third and fourth tracks 16C and 16D, which additional inputs are not illustrated in FIG. 7.

Controller 78 may also receive other inputs such as advance speed or other operational parameters of machine 10.

The controller 78 can control the volume and direction of hydraulic flow to and from the steering cylinder 50A and hydraulic ram 40A via control signals sent to three way valves 68A and 70A, respectively, over control lines 80A and 84A. The controller 78 can control the position of the bypass valves 71A and 73A via control signals sent over control lines 82A and 86A, respectively.

If three way valve 70A is in its blocked position 98A, and the bypass valves 71A and 73A are also in their blocked or closed positions, then the hydraulic ram 40A is hydraulically blocked so that it cannot move.

The hydraulic control system shown in FIG. 7 associated with hydraulic ram 40A has two alternative un-blocked positions.

In a first un-blocked position, if three way valve 70A is in its closed position 98A, and the bypass valves 71A and 73A are in their open positions, the hydraulic ram 40A is unblocked and is free to be moved by any force including but not limited to the action of the crawler track 16A pivoting the swing leg 14A. This may be described as a free floating arrangement for the hydraulic ram 40A.

In a second un-blocked position, if the three way valve 70A is in either of its positions 88A or 96A, and the bypass valves 71A and 73A are in their closed positions, then the motion of the hydraulic ram 40A can be actively facilitated by hydraulic power, or can be forced by hydraulic power, depending upon the volume of fluid supplied by pump 65A under the control of controller 78.

Similarly, the three way valve 68A associated with the steering cylinder 50A defines first and second positions 100A and 102A controlling the direction of flow to and from the steering cylinder 50A, and a third position 104A in which flow to and from the steering cylinder 50A is blocked so as to hold or maintain a given steering position of the crawler track 16A relative to the swing leg 14A.

The hydraulic lines and control lines for steering cylinder 50B and hydraulic ram 40B associated with the second crawler track 16B and the second swing leg 14B are schematically shown on the right hand side of FIG. 7 and analogous components are designated by the same numerals using a suffix B in place of a suffix A.

Figure 7A:
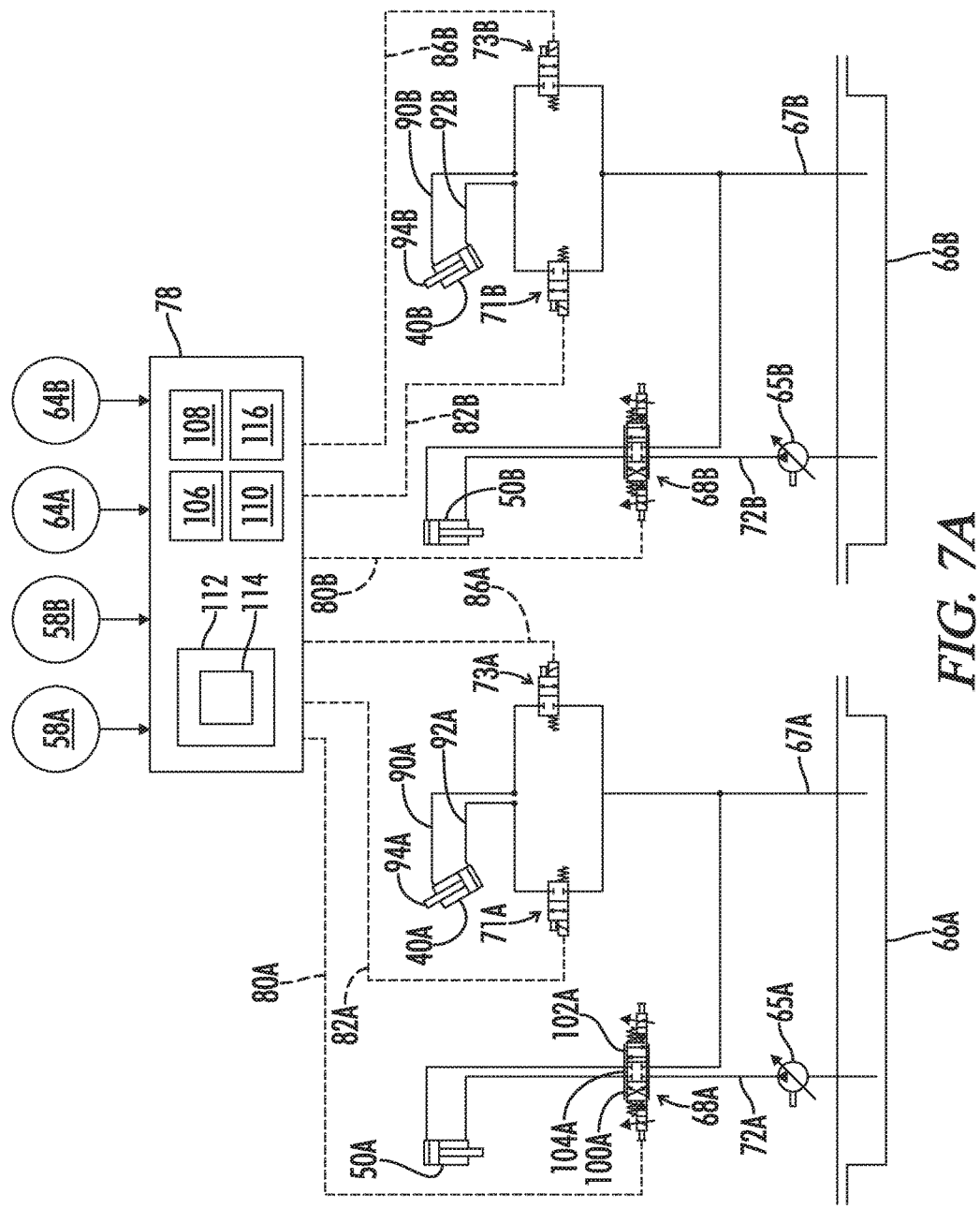
FIG. 7A is a schematic illustration similar to FIG. 7 showing an alternative embodiment of a hydraulic control system for blocking and unblocking the pivoting motion of the swing legs.

FIG. 7A is similar to FIG. 7 and illustrates a first alternative embodiment of the hydraulic control systems associated with the hydraulic rams 40A and 40B. In the embodiment of FIG. 7A the three way valves 70A and 70B of FIG. 7 have been eliminated so that the locking and unlocking of the hydraulic rams 40A and 40B is controlled solely by the bypass valves. This provides what may be referred to as a free floating arrangement of the hydraulic rams 40A and 40B. For example, the ram 40A and bypass valves 71A and 73A, along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. First and second hydraulic lines 90A and 92A connect the fluid reservoir 66A to the first and second ends of the cylinder. The first and second bypass valves 71A and 73A are connected to the hydraulic lines 92A and 90A, respectively. Each bypass valve has a blocked position and a bypass position, the bypass position communicating the respective end of the first hydraulic ram 40A to the fluid reservoir 66A. In the hydraulically blocked position of the hydraulic control system, the first and second bypass valves 71A and 73A are in their blocked positions. In the hydraulically un-blocked position of the hydraulic control system the first and second bypass valves 71A and 73A are in their bypass positions. With this arrangement, when in the un-blocked position, the swing leg 14A is free to be moved by the forces created by engagement of the track 16A with the ground, or with any other forces imposed on the swing leg 14A, but there is no active facilitation of the pivoting of the swing leg by the hydraulic ram 40A.

It is noted that in the embodiment of FIG. 7A the pivot angle sensors 64A and 64B are not required and may be eliminated.

Figure 7B:
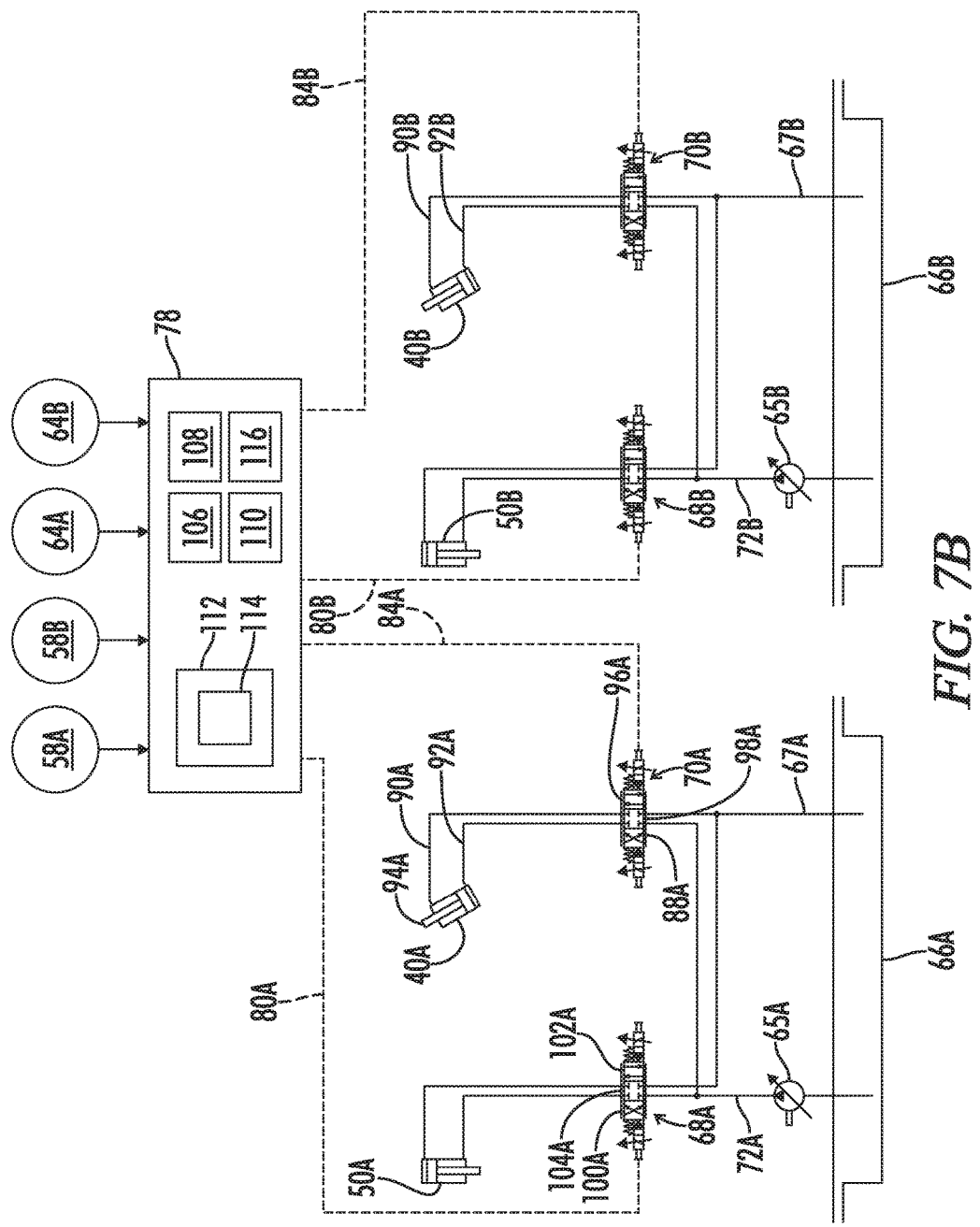
FIG. 7B is a schematic illustration similar to FIG. 7 showing another alternative embodiment of a hydraulic control system for blocking and unblocking the pivoting motion of the swing legs.

FIG. 7B is similar to FIG. 7 and illustrates a second alternative embodiment of the hydraulic control systems associated with the hydraulic rams 40A and 40B. In the embodiment of FIG. 7B the bypass valves have been eliminated so that the locking and unlocking of the hydraulic rams 40A and 40B is controlled solely by the three way valves 70A and 70B. This provides what may be referred to as a stroke controlled arrangement of the hydraulic rams 40A and 40B. For example, the ram 40A and three way valve 70A along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. The three way valve 70A has an extension position 96A, a retraction position 88A, and a blocked position 98A. The hydraulic lines 90A and 92A connect the three way valve 70A to the first and second ends of the cylinder. The supply line includes supply line 72A and a selected one of the lines 90A and 92A, and the return line includes the return line 67A and the other of the lines 90A and 92A. In the hydraulically blocked position of the hydraulic control system the three way valve 70A is in the blocked position 98A. In the hydraulically un-blocked position of the hydraulic control system, the three way valve 70A is in either its extension or retraction position 96A or 88A, and the controller 78 is configured such that the first hydraulic ram 40A actively facilitates the pivoting of the first swing leg 14A. The controller 78 may determine a specific amount of desired movement of the swing leg 14A via an algorithm, and the controller 78 may then cause a specific volume of fluid to be delivered to hydraulic ram 40A so that a stroke or extension of the hydraulic ram 40A is exactly controlled. The algorithm preferably calculates the exact movement of the swing leg 14A which will result from the steering of the track 16A, and then actively facilitates the movement of the swing leg by that same amount so that frictional forces in the swing leg assembly are compensated for by the active facilitation. It will be understood that with this arrangement, if the algorithm is slightly in error it is the stroke imparted to the hydraulic ram 40A that will control the final pivotal position of the swing leg 14A.

Figure 7C:
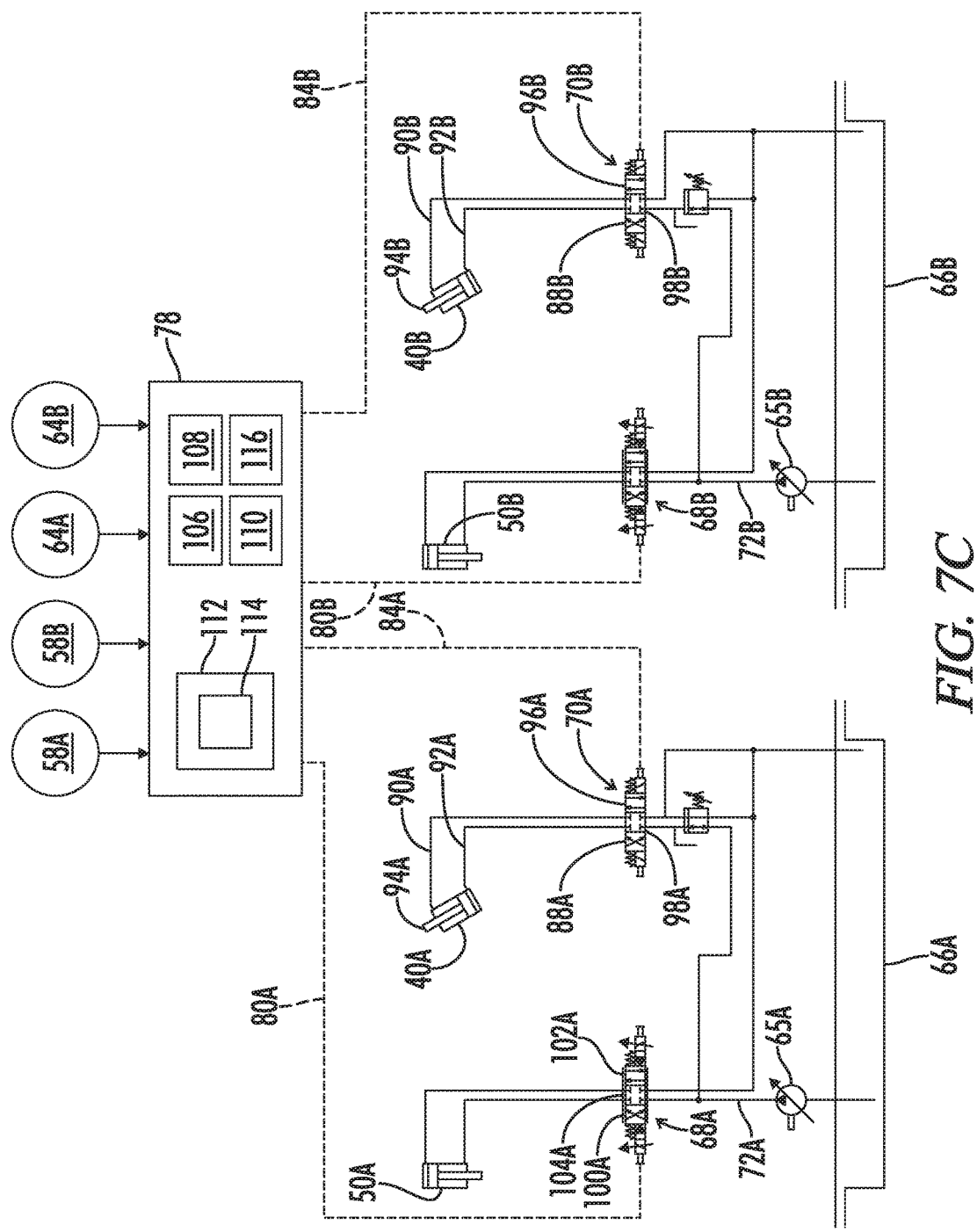
FIG. 7C is a schematic illustration similar to FIG. 7 showing another alternative embodiment of a hydraulic control system for blocking and unblocking the pivoting motion of the swing legs.

FIG. 7C is similar to FIG. 7 and illustrates a third alternative embodiment of the hydraulic control systems associated with the hydraulic rams 40A and 40B. In the embodiment of FIG. 7C the bypass valves have been eliminated and the three way valves 70A and 70B have been modified to be simpler and less expensive three way valves that are not servo-valves. Also, pressure control valves 75A and 75B have been added in the fluid supply lines 72A and 72B upstream of the three way valves 70A and 70B. With this arrangement the controller 78 is configured such that the active facilitation of the pivoting of the swing legs 14A and 14B by the hydraulic rams 40A and 40B is limited to providing a hydraulic pressure to the hydraulic rams 40A and 40B controlled by the pressure control valves 75A and 75B.

The arrangement of FIG. 7C provides what may be referred to as a pressure controlled arrangement of the hydraulic rams 40A and 40B. For example, the ram 40A and three way valve 70A along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. The three way valve 70A has an extension position 96A, a retraction position 88A, and a blocked position 98A. Hydraulic lines 90A and 92A connect the three way valve 70A to the first and second ends of the cylinder. The supply line includes supply line 72A and a selected one of the lines 90A and 92A, and the return line includes the return line 67A and the other of the lines 90A and 92A. In the hydraulically blocked position of the hydraulic control system the three way valve 70A is in the blocked position 98A. In the hydraulically un-blocked position of the hydraulic control system, the three way valve 70A is in either its extension or retraction position 96A or 88A, and the controller 78 is configured such that the first hydraulic ram 40A actively facilitates the pivoting of the first swing leg 14A by supplying a pressure to the selected end of the hydraulic ram 40A controlled by the pressure control valve 75A. It will be understood that with this arrangement, the steering of the track 16A will control the final pivotal position of the swing leg 14A, and the pressure provided via the three way valve 70A and pressure control valve 75A will merely help overcome frictional resistance to that pivoting movement.

Controller 78 includes a processor 106, a computer readable memory medium 108, a data base 110 and an input/output module or control panel 112 having a display 114.

The term "computer-readable memory medium" as used herein may refer to any non-transitory medium 108 alone or as one of a plurality of non-transitory memory media 108 within which is embodied a computer program product 116 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The controller 78 receives input data from the sensors 58 and 64. The controller also receives other inputs such as the track speed and magnitude of movement. Based upon the programming 116 the controller 78 can calculate the pivot angle 28 resulting from any given steering inputs to the tracks 16. Such calculations may be based upon the geometry of the system shown in FIG. 5 as previously described.

As seen in FIG. 5, as the track 16A advances in the track steering direction 32 by one unit of magnitude, the perpendicular component 26 of movement will be equal to the sine of angle 24, and the parallel component of movement 30 will be equal to the cosine of angle 24. The controller 78 can monitor track speed and thus determine the magnitude of movement 30 and the magnitude of the perpendicular component 26.

Knowing the magnitude of the perpendicular component 26, the change in the pivot angle 28 can then be calculated as the angle whose sine is equal to the perpendicular component 26 divided by the distance between pivot points 42A and 44A.

Figure 8:
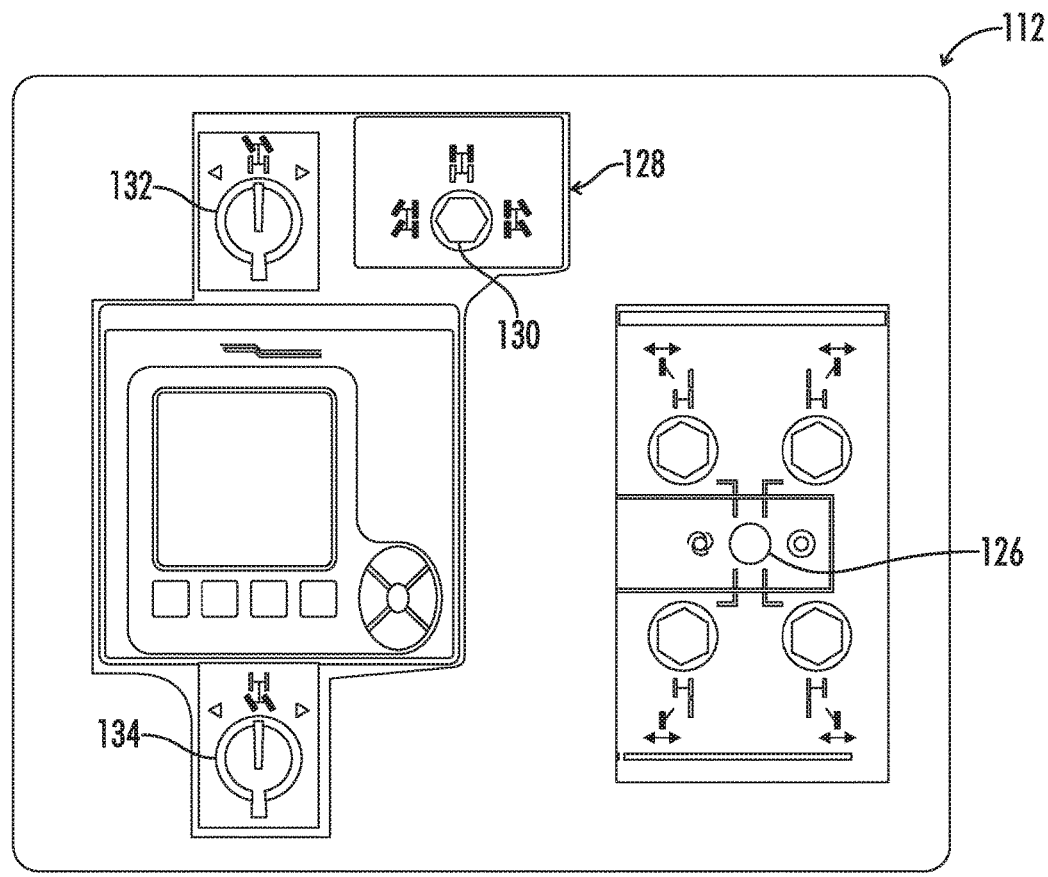
FIG. 8 is a schematic view of the control panel of the controller of FIG. 7.

FIG. 8 is a schematic view of the control panel 112. It will be understood that the control panel 112 as shown in FIG. 8 is simplified to show only the controls of interest, and control panel 112 will typically include many controls other than those shown. Also, the control panel 112 may comprise one consolidated control panel for all the controls shown, or those controls may be distributed among two or more control panels.

Figure 9:
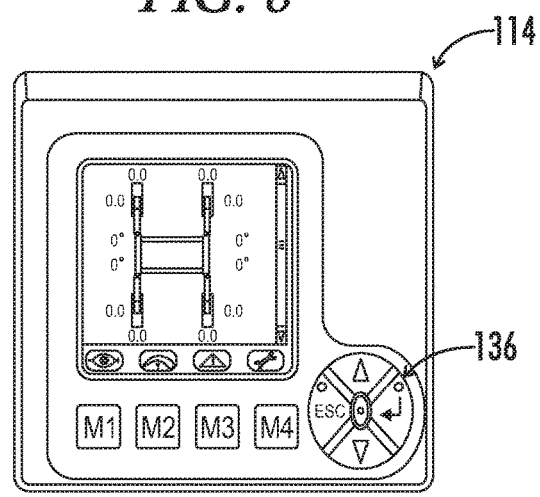
FIG. 9 is an enlarged view of the display screen and certain ones of the input controls for the control panel of FIG. 8.

FIG. 9 is a schematic view of the display unit 114 of the control panel 112.

The controller 78 includes a swing leg pivot mode configured to allow each swing leg to pivot relative to the machine frame in response to steering of the crawler track 16 associated with the swing leg 14. The swing leg pivot mode may be selected by pressing the control button 126. The swing leg pivot mode may be implemented in either a manual sub-mode or an automatic sub-mode.

Upon initiation of the swing leg pivot mode upon pressing of button 126, the swing leg pivot mode will be in the manual sub-mode, unless the automatic sub-mode is selected by further inputs to the control panel 112.

In the manual sub-mode, the swing leg pivot mode includes a track selection feature 128 allowing an operator to select individual steering control of either of the first and second crawler tracks 16A and 16B or synchronous steering control of both of the first and second crawler tracks via three way switch 130, as graphically shown in FIG. 8. After selection of steering of the left track or right track or both, the actual steering input to either the front or rear track(s) is accomplished by twisting of either the forward steering control 132 or the rear track steering control 134.

The track and leg movement corresponding to individual control solely of the first crawler track 16A is illustrated for example in FIG. 1. This would be accomplished in the manual sub-mode by first selecting the left position of switch 130 and then steering with the forward steering control 132.

Figure 2:
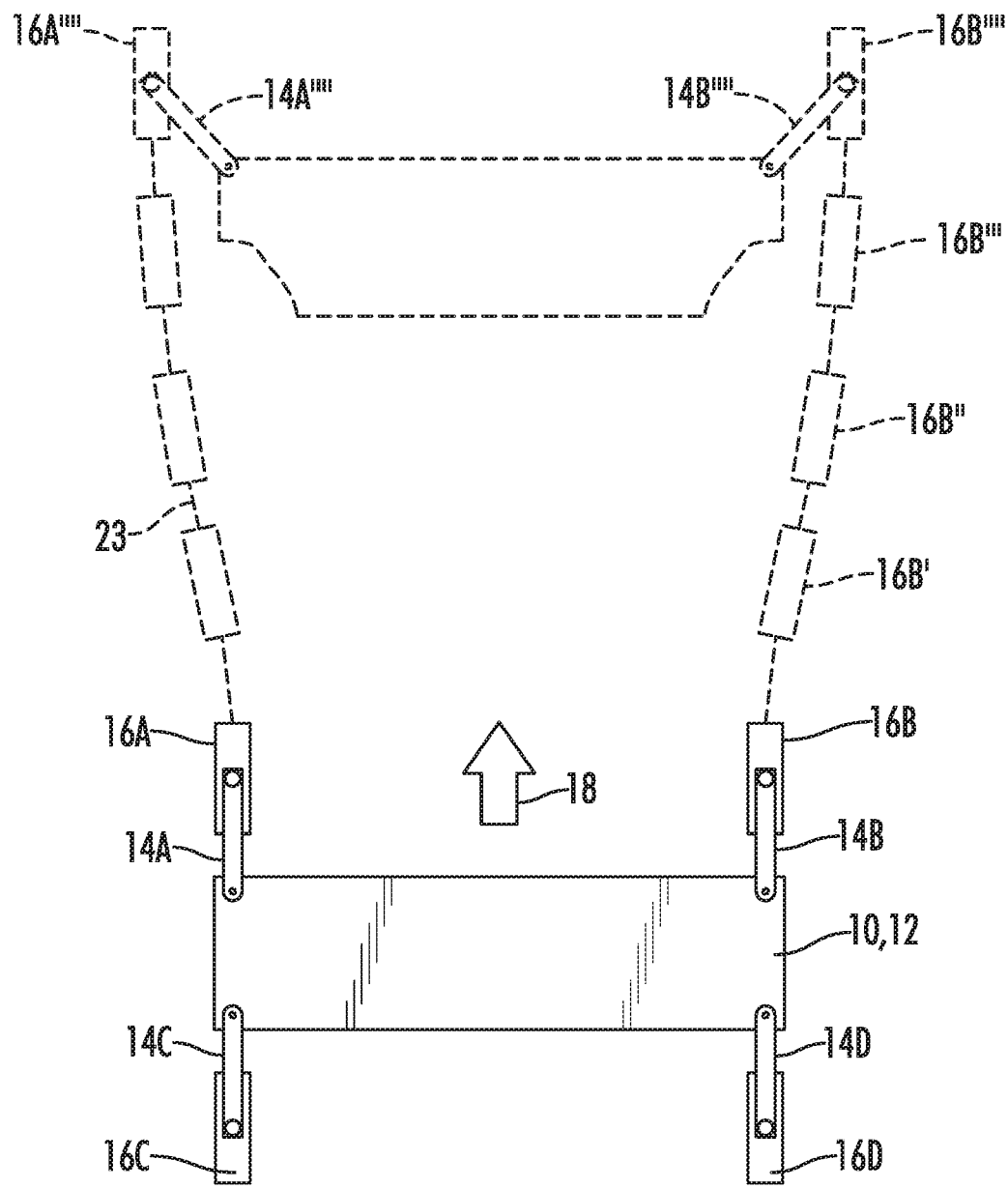
FIG. 2 is a schematic plan view similar to FIG. 1 showing both the left and right front crawler tracks being steered outward away from each other to pivot both of the front swing legs outward away from each other as the construction machine moves from the initial position to the final position.

FIG. 2 schematically illustrates the use of synchronous steering control of the first and second crawler tracks 16A and 16B. When using the synchronous steering control the track selection feature is configured to steer the first and second crawler tracks 16A and 16B in opposite direction steering angles 24. This may be described as continuously steering the second crawler track 16B at a steering angle opposite to the steering angle 24 of the first crawler track 16A and thereby pivoting the second swing leg 14B relative to the machine frame 12 in a second pivotal direction opposite the first pivotal direction of the first swing leg 14A.

To perform synchronous steering in the manual sub-mode, the middle position of switch 128 is selected. In manual sub-mode, when synchronous steering is selected, the manual steering control 132 or 134 may default for example to direct steering of the left side crawler track, and the controller 78 will provide an equal but opposite steering input to the right side crawler track.

To perform the synchronous steering in the automatic sub-mode, command inputs may be made to the control panel 112 through the various mode selection buttons M1-M4 and the input controls 136 as best seen in FIG. 9. Inputs to the input controls 136 may quantitatively define a desired change in position of the swing legs by defining a desired change in the pivot angle 28, or by defining a desired change in lateral position of the tracks 16, or by defining a desired lateral spacing between crawler tracks or the like, or by defining any other geometrically defined parameter of the positioning of the tracks and swing legs. The processor 106 may then implement algorithms contained in the program 116 to cause the tracks to steer so as to traverse a desired path such as the S-curve previously described, or any other curve. In performing the S-curve the track is steered along the ground surface beginning at a zero steering angle 24 parallel to the initial direction 19 and then steering first away from and then back toward the initial direction until the crawler track 16 is again parallel to the initial direction or other desired steering direction. The other desired steering direction may for example by a direction of the track 16 corresponding to a current direction of the machine 10 which has changed during the process of pivoting the swing leg, with the appropriate direction of the track 16 being determined by the Ackermann steering principle.

In the automatic sub-mode the control panel 112 may steer any selected one of the crawler tracks to pivot its associated swing leg, or it may steer both front tracks or both rear tracks in synchronous format as previously described.

In the example shown in FIG. 2, the first and second pivotal directions are such that the first and second swing legs 14A and 14B pivot away from each other. Similarly, the first and second pivotal directions could be such that the first and second swing legs pivot toward each other.

Figure 3:
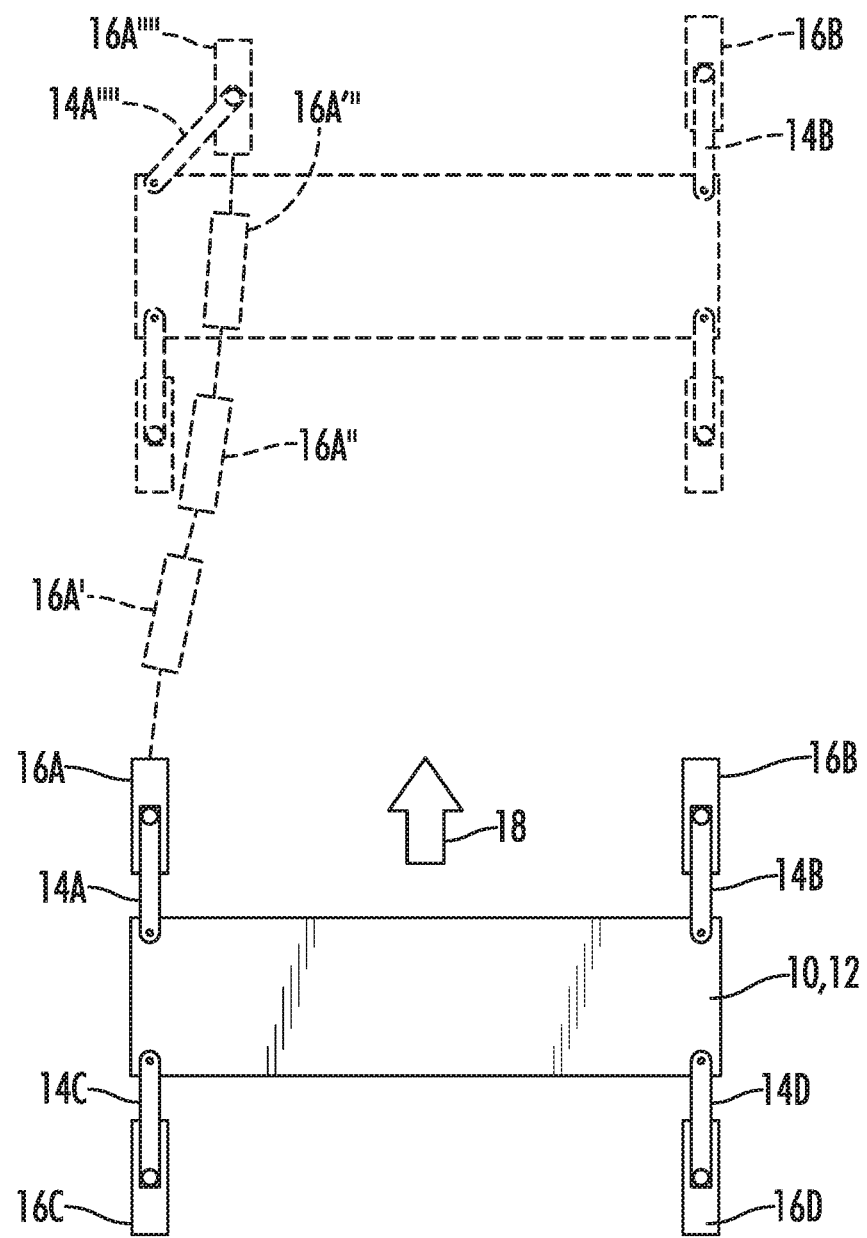
FIG. 3 is a view similar to FIG. 1, showing the left front crawler track having been steered to pivot the left front swing leg inward as the machine moves from the initial position to the final position.

FIG. 3 shows an example of a laterally inward steering of the first crawler track 16A resulting in a laterally inward pivotal motion of the first swing leg 14A. The second crawler track 16B could similarly be steered laterally inward so that the second pivotal leg 14B pivots inward toward the first swing leg 14A. The steering of FIG. 3 could be accomplished in manual mode by first activating the swing leg pivot mode via button 126, then selecting left side steer via switch 130, then steering with the front steering control 132. The steering of FIG. 3 could also be accomplished in the automatic sub-mode via appropriate inputs to the input controls 136 and M1-M4.

Figure 4:
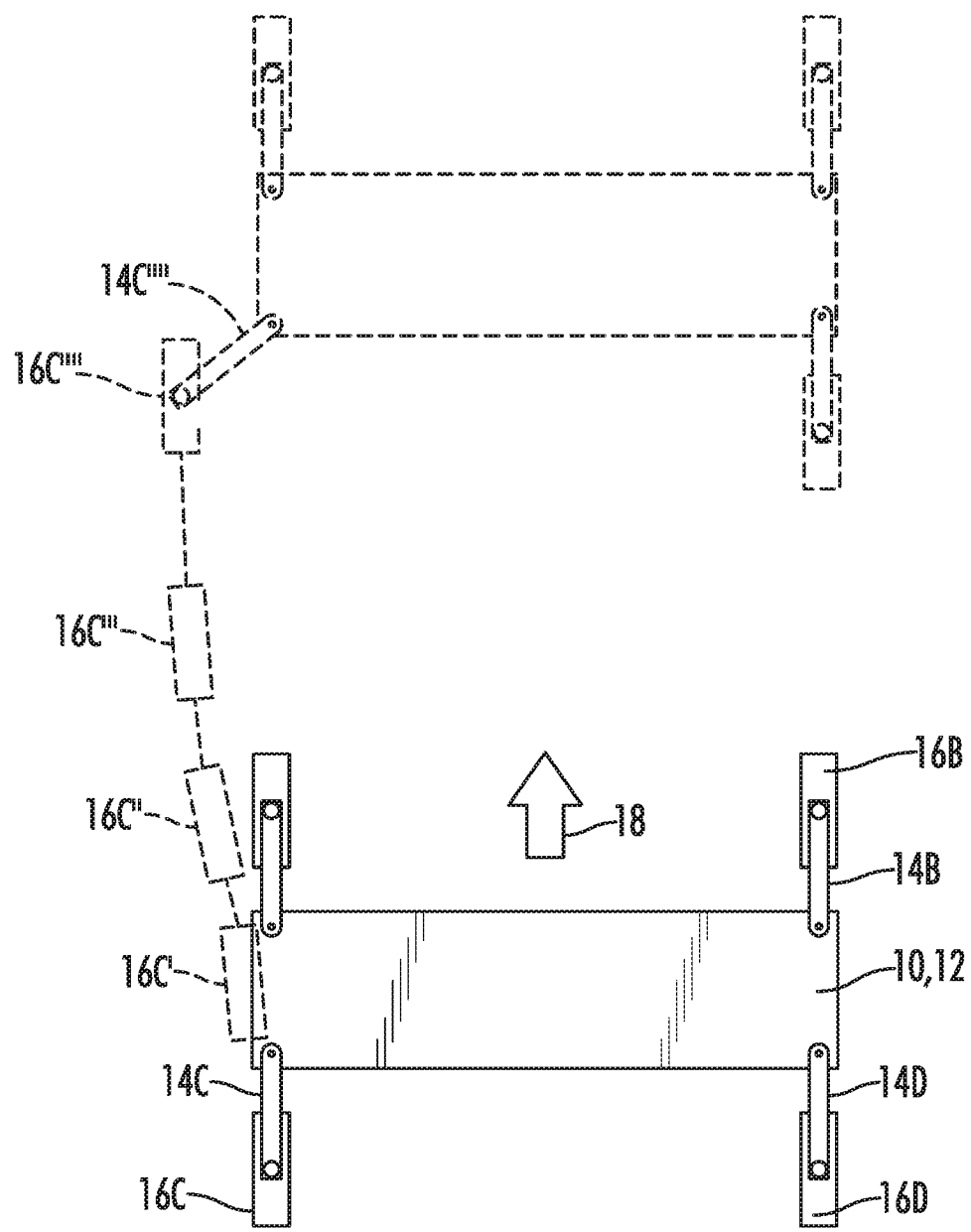
FIG. 4 is a view similar to FIG. 1, showing the left rear crawler track having been steered so as to pivot the left rear swing leg outward as the machine moves from the initial position to the final position.

As illustrated in FIG. 4, similar control may be provided to the steering of the third and/or fourth crawler tracks 16C and 16D. In FIG. 4, the situation is illustrated where the third crawler 16C has been steered laterally outward so as to pivot the third swing leg 14C outward as shown in FIG. 4. Both rear crawler tracks 16C and 16D may be synchronously steered either laterally outward to pivot the swing legs 14C and 14D away from each other, or laterally inward to pivot the swing legs 14C and 14D toward each other. The steering illustrated in FIG. 4 may be accomplished in manual sub-mode by first activating the swing leg pivot mode via button 126, the selecting left side steering via switch 130, then steering via the rear steering control 134. The steering of FIG. 4 could also be accomplished in the automatic sub-mode via appropriate inputs to the input controls 136 and M1-M4.

During any of the steering operations schematically illustrated in FIGS. 1-4, during the steering operation, when the swing legs are being pivoted, the associated hydraulic rams 40 may be placed in an unblocked position, which may be described as deactivating the hydraulic rams or linear actuators, or as unlocking the hydraulic rams, so that the hydraulic rams do not resist the pivotal motion of the associated swing leg relative to the machine frame. For example, in the embodiment of FIG. 7, hydraulic ram 40A may be placed in an unblocked position by closing three way valve 70A and opening the bypass valves 71A and 73A.

After the steering operation is complete and the swing legs are in the desired final position, the associated hydraulic ram 40 may be activated by placing the hydraulic ram in a blocked position to hold or lock the associated swing leg in the revised pivotal position. For example, in the embodiment of FIG. 7, the hydraulic ram 40A may be placed in the blocked position by closing three way valve 70A and closing the bypass valves 71A and 73A.

Alternatively, in the embodiment of FIG. 7, during the steering operation the hydraulic ram 40 may be placed in one of the activated positions 88 or 96 to retract or extend the piston 94 so as to actively facilitate the pivotal motion of the associated swing leg relative to the machine frame. To accomplish such active facilitation of the hydraulic ram 40A, the bypass valves 71A and 73A are placed in their closed positions, and the three way valve 70A is moved to either its position 88A or 96A. The flow rate of hydraulic fluid directed to the hydraulic ram 40 may be controlled by the three way valve 70.

The hydraulic ram 40A may be described as a first hydraulic actuator 40A connected between the machine frame 12 and the first swing leg 14A, and configured to change in length as the first swing leg 14A pivots relative to the machine frame 12. The valves associated with the first hydraulic actuator 40A can be switched so that the hydraulic actuator is in a hydraulically blocked position as described above preventing pivoting of the first swing leg 14A or a hydraulically unblocked position as described above permitting pivoting of the first swing leg 14A.

The controller 78 may be configured such that the hydraulic actuator or ram 40 associated with each swing leg 14 to be pivoted is placed in an unblocked position prior to pivoting of the swing leg 14.

The controller 78 may be configured such that upon deactivation of the swing leg pivot mode, the valves associated with the hydraulic actuators or rams 40 are in their blocked positions.

Thus it is seen that the apparatus and methods of the present invention readily achieve the ends and advantages mentioned as well as those inherent therein. Although certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A construction machine, comprising:
   a machine frame;
   first and second swing legs pivotally connected to the machine frame;
   first and second ground engaging units steerably connected to the first and second swing legs, respectively, the ground engaging units including drive motors configured such that the ground engaging units are driven across a ground surface by the drive motors;
   a first steering sensor configured to detect a first steering angle of the first ground engaging unit relative to the first swing leg:
   a second steering sensor configured to detect a second steering angle of the second ground engaging unit relative to the second swing leg; and
   a controller including a swing leg pivot mode, the swing leg pivot mode including:
      a first sub-mode configured to allow steering of at least one of the ground engaging units in response to an input by a human operator such that the swing leg associated with the at least one of the ground engaging units pivots relative to the machine frame in response to steering of the at least one of the ground engaging units; and
      a second sub-mode configured to automatically under direction of the controller steer the at least one ground engaging unit back toward a final steering direction corresponding to a current direction of the machine.

2. The machine of claim 1, wherein:
   the swing leg pivot mode includes a ground engaging unit selection feature allowing the operator to select individual steering control of either of the first and second ground engaging units or synchronous steering control of both the first and second ground engaging units.

3. The machine of claim 2, wherein:
   the synchronous steering control of the ground engaging unit selection feature is configured to steer the first and second ground engaging units in opposite directions.

4. The machine of claim 1, further comprising:
   a first lock configured to selectively lock and unlock the first swing leg in pivotal position relative to the machine frame;
   a second lock configured to selectively lock and unlock the second swing leg in pivotal position relative to the machine frame;
   wherein the first lock includes a first hydraulic system connected between the machine frame and the first swing leg, and configured to change in length as the first swing leg pivots relative to the machine frame, the first hydraulic system having a hydraulically blocked position preventing pivoting of the first swing leg and a hydraulically un-blocked position permitting pivoting of the first swing leg; and
   wherein the second lock includes a second hydraulic system connected between the machine frame and the second swing leg, and configured to change in length as the second swing leg pivots relative to the machine frame, the second hydraulic system having a hydraulically blocked position preventing pivoting of the second swing leg and a hydraulically un-blocked position permitting pivoting of the second swing leg.

5. The machine of claim 4, wherein:
   the swing leg pivot mode is configured such that the hydraulic system associated with each swing leg to be pivoted is moved to the un-blocked position.

6. The machine of claim 5, wherein:
   the swing leg pivot mode is configured such that upon deactivation of the swing leg pivot mode the hydraulic systems are in their blocked positions.

7. The machine of claim 1, wherein:
   the first and second swing legs are forward extending swing legs.

8. The machine of claim 7, further comprising:
   third and fourth rearward extending swing legs and third and fourth ground engaging units connected to the third and fourth rearward extending swing legs, respectively.

9. The machine of claim 1, wherein:
   in the second sub-mode the controller causes the ground engaging unit of a swing leg that is to be pivoted to be steered in an S-curve along the ground surface beginning in an initial direction of the ground engaging unit of the swing leg that is to be pivoted, then steering away from and then back toward the final steering direction.

10. The machine of claim 9, wherein:
    in the second sub-mode the controller causes the ground engaging unit of the swing leg that is to be pivoted to be steered back to the initial direction.

11. The machine of claim 1, wherein:
    in the second sub-mode the controller causes the ground engaging unit of the swing leg that is to be pivoted to be steered back to the final steering direction.

12. The machine of claim 1, wherein the machine is a slip form paving machine.

13. The machine of claim 1, wherein the ground engaging units comprise crawler tracks.

14. The machine of claim 1, further comprising:
    a first pivot sensor configured to detect a first pivot angle of the first swing leg relative to the machine frame; and
    a second pivot sensor configured to detect a second pivot angle of the second swing leg relative to the machine frame.

15. The machine of claim 1, wherein:
    the controller includes a selector to allow the human operator to select one of the first and second sub-modes.

16. A construction machine, comprising:
    a machine frame;
    first and second swing legs pivotally connected to the machine frame;
    first and second ground engaging units steerably connected to the first and second swing legs, respectively, the ground engaging units including drive motors configured such that the ground engaging units are driven across a ground surface by the drive motors;
    a first steering sensor configured to detect a first steering angle of the first ground engaging unit relative to the first swing leg:
    a second steering sensor configured to detect a second steering angle of the second ground engaging unit relative to the second swing leg; and
    a controller including a swing leg pivot mode, the swing leg pivot mode including:
       a first sub-mode configured to allow steering of at least one of the ground engaging units in response to an input by a human operator from an initial steering direction such that the swing leg associated with the at least one of the ground engaging units pivots relative to the machine frame in response to steering of the at least one of the ground engaging units; and
       a second sub-mode configured to automatically under direction of the controller steer the at least one ground engaging unit through a desired path.

17. The machine of claim 16, wherein:
the controller includes a selector to allow the human operator to select one of the first and second sub-modes.
18. The machine of claim 16, wherein:
in the second sub-mode the controller causes the at least one ground engaging unit to be steered back to the initial direction.
19. The machine of claim 16, wherein:
in the second sub-mode the controller causes the at least one ground engaging unit to be steered back to a final direction corresponding to a current direction of the machine.

\* \* \* \* \*

UNITED STATES PATENT AND TRADEMARK OFFICE
CERTIFICATE OF CORRECTION

PATENT NO. : 9,663,905 B2
APPLICATION NO. : 15/203890
DATED : May 30, 2017
INVENTOR(S) : Dahm et al.

Page 1 of 1

It is certified that error appears in the above-identified patent and that said Letters Patent is hereby corrected as shown below:

On the Title Page

Item (72) Inventors is corrected to read:
Martin Dahm, Gieleroth (DE); Ralf Schug, Oberlahr (DE); Cyrus Barimani, Königswinter (DE)

Signed and Sealed this
Tenth Day of October, 2017

Joseph Matal
*Performing the Functions and Duties of the*
*Under Secretary of Commerce for Intellectual Property and*
*Director of the United States Patent and Trademark Office*